United States Patent
Cao

(10) Patent No.: US 10,633,295 B2
(45) Date of Patent: Apr. 28, 2020

(54) SOUND-ABSORBING MATERIAL PARTICLE AND PREPARATION METHOD THEREOF

(71) Applicant: Goertek Inc., Shandong (CN)

(72) Inventor: Xiaodong Cao, Shandong (CN)

(73) Assignee: Goertek, Inc., Shandong (CN)

( * ) Notice: Subject to any disclaimer, the term of this patent is extended or adjusted under 35 U.S.C. 154(b) by 0 days.

(21) Appl. No.: 15/781,268

(22) PCT Filed: May 18, 2016

(86) PCT No.: PCT/CN2016/082471
§ 371 (c)(1),
(2) Date: Jun. 4, 2018

(87) PCT Pub. No.: WO2017/092242
PCT Pub. Date: Jun. 8, 2017

(65) Prior Publication Data
US 2018/0354865 A1  Dec. 13, 2018

(51) Int. Cl.
| | | |
|---|---|---|
| *C04B 41/45* | (2006.01) | |
| *C04B 41/46* | (2006.01) | |
| *C04B 41/50* | (2006.01) | |
| *C04B 38/00* | (2006.01) | |
| *C04B 41/00* | (2006.01) | |
| *C04B 41/85* | (2006.01) | |
| *G10K 11/162* | (2006.01) | |
| *C04B 111/52* | (2006.01) | |

(52) U.S. Cl.
CPC ...... *C04B 41/5024* (2013.01); *C04B 38/0012* (2013.01); *C04B 41/009* (2013.01);
(Continued)

(58) Field of Classification Search
CPC ....... C04B 35/00; C04B 35/52; C04B 41/009; C04B 41/4584; C04B 41/4539;
(Continued)

(56) References Cited

U.S. PATENT DOCUMENTS 3,444,277 A    5/1969  McMillan
2002/0193234 A1*  12/2002  Oda .................. C04B 28/26
                                                                 501/80

FOREIGN PATENT DOCUMENTS

CN    1267344 A    9/2000
CN    1404459 A    3/2003
(Continued)

OTHER PUBLICATIONS

Putzig et al. "Instabilities, defects, and defect ordering in an overdamped active nematic". Soft Matter. vol. 12, Issue 17 (2016). pp. 3854-3859. (Year: 2016).*

(Continued)

*Primary Examiner* — Alexander M Weddle
(74) *Attorney, Agent, or Firm* — Patent Law Works LLP

(57) ABSTRACT

The invention discloses a sound-absorbing material particle and a preparation method thereof. The preparation method comprises the following steps: step 1, mixing a sound-absorbing raw material with a templating agent and water to prepare a sound-absorbing slurry, filling a reaction kettle with a porous ceramic substrate and the sound-absorbing slurry that are mixed together; step 2, performing hydrothermal crystallization in the reaction kettle to ensure that the sound-absorbing raw material is crystallized on the porous ceramic substrate and constitutes the sound-absorbing material particle together with the porous ceramic substrate; step 3, performing solid-liquid separation on the materials in the reaction kettle; and step 4, drying and roasting the sound-absorbing material particle.

7 Claims, 1 Drawing Sheet

--- step 1, mixing a sound-absorbing raw material with a templating agent and water to prepare a sound-absorbing slurry, filling a reaction kettle with a porous ceramic substrate and the sound-absorbing slurry that are mixed together

↓ step 2, performing hydrothermal crystallization in the reaction kettle to ensure that the sound-absorbing raw material is crystallized on the porous ceramic substrate and constitutes the sound-absorbing material particle together with the porous ceramic substrate

↓ step 3, performing solid-liquid separation on the materials in the reaction kettle

↓ step 4, drying and roasting the sound-absorbing material particle

(52) U.S. Cl.
CPC .......... *C04B 41/4584* (2013.01); *C04B 41/85* (2013.01); *G10K 11/162* (2013.01); *C04B 2111/52* (2013.01)

(58) Field of Classification Search
CPC ............ C04B 41/5001; C04B 41/5037; C04B 41/5024; C04B 41/85; C04B 41/004838; C04B 41/00; C04B 41/0006; C04B 41/0012; C04B 41/0074; C04B 2111/52; C04B 38/00; C04B 38/0006; C04B 38/0012; C04B 38/0074; G10K 11/162
USPC .......................................................... 427/212
See application file for complete search history.

(56) References Cited

FOREIGN PATENT DOCUMENTS

| CN | 204350287 U | 5/2015 |
|---|---|---|
| CN | 104844968 A | 8/2015 |
| CN | 104994461 A | 10/2015 |
| CN | 106966408 A | 7/2017 |
| CN | 109438260 A | 3/2019 |
| CN | 110023242 A | 7/2019 |
| EP | 0640573 A1 | 3/1995 |

OTHER PUBLICATIONS

First Search, Chinese Application No. 201510888219.4, dated Dec. 3, 2015, 1 page (Chinese).
Supplementary Search, Chinese Application No. 201510888219.4, dated Dec. 3, 2015, 1 page (Chinese).
International Search Report, PCT/CN2016/082471, dated Sep. 2, 2016, 2 pages.
Written Opinion of the International Search Authority PCT/CN2016/082471, dated Sep. 2, 2016, 5 pages.
Chinese Office Action, Chinese Application No. 201510888219.4, dated Feb. 27, 2017, 8 pages (Chinese).
Notification to Grant Patent Right for Invention Chinese Application No. 201510888219.4, dated Nov. 6, 2017, 3 pages (Chinese).

* cited by examiner

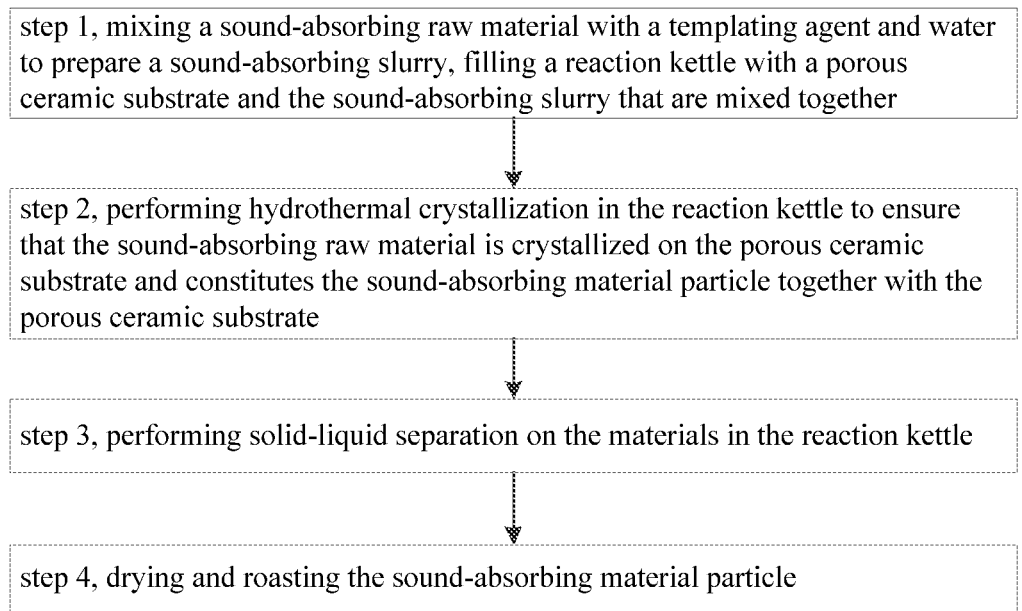

SOUND-ABSORBING MATERIAL PARTICLE AND PREPARATION METHOD THEREOF

CROSS-REFERENCE TO RELATED APPLICATIONS

This application is a National Stage of International Application No. PCT/CN2016/082471, filed on May 18, 2016, which claims priority to Chinese Patent Application No. 201510888219.4, filed on Dec. 3, 2015, both of which are hereby incorporated by reference in their entireties.

FIELD OF THE INVENTION

The invention belongs to the technical field of material processing and particularly relates to a sound-absorbing material particle and a preparation method thereof.

BACKGROUND OF THE INVENTION

In recent years, as wearable electronic products are becoming thinner and thinner, a traditional foamed sound-absorbing material cannot meet the demand for debugging or correction of sound-absorbing performance in the micro-speaker industry. Through constant development and trial of novel sound-absorbing materials, those skilled in the art discovered after verification that placing a porous sound-absorbing material in a rear cavity of a speaker can effectively improve the speaker's acoustic performance. The novel sound-absorbing material used at present comprises non-foamed sound-absorbing materials such as natural zeolite, activated carbon, white carbon black and zeolite powder with the silica-alumina ratio of 200 or above. During application, the above-mentioned powdery non-foamed sound-absorbing materials need to be prepared into particles at first. After that, the rear cavity of the speaker is filled with the sound-absorbing material particles of which the particle sizes can be adjusted in accordance with the size and the structure of the rear cavity of the speaker.

In this technical field, the commonly used granulation methods include extrusion, boiling granulation, spray drying, rolling into balls, etc. Particles made by extrusion, boiling granulation and rolling into balls are poor in strength, unsmooth in surface, uneven in size and limited in physical structure and performance, and have the main problems of small pore volumes and diameters. Consequently, sound-absorbing material particles made of these particles may have a limited sound-absorbing effect. Air circulation in the rear cavity of the speaker may also be influenced. Particles formed by spray drying are relatively smaller, non-uniform in particle size distribution and unsatisfactory in sound-absorbing effect. The processing process results in limited mass transfer efficiency and sound-absorbing effect of the sound-absorbing material particles and failure of a desired effect.

To sum up, it is necessary to improve the sound-absorbing material particles or a preparation method thereof. By improving the characteristics, including the uniformity of particle sizes, the structural strength, etc., of the sound-absorbing material particles, the sound-absorbing effect of the sound-absorbing material particles may be improved.

SUMMARY OF THE INVENTION

An objective of the present invention is to provide a new technical solution for preparation of a sound-absorbing material particle.

According to a first aspect of the present invention, there is provides a preparation method of a sound-absorbing material particle. The preparation method comprises:

step 1, mixing a sound-absorbing raw material with an organic templating agent and water to prepare a sound-absorbing slurry, filling a reaction kettle with a porous ceramic substrate and the sound-absorbing slurry that are mixed together.

step 2, performing hydrothermal crystallization in the reaction kettle to ensure that the sound-absorbing raw material is crystallized on the porous ceramic substrate and constitutes the sound-absorbing material particle together with the porous ceramic substrate;

step 3, performing solid-liquid separation on the materials in the reaction kettle; and step 4, drying and roasting the sound-absorbing material particle.

Optionally, the porous ceramic substrate in the step 1 is a honeycomb ceramic particle or a porous ceramic microsphere, of which the particle size is 0.05-1.0 mm.

Optionally, the purity of the organic templating agent in the step 1 is more than 95%. The addition of the organic templating agent accounts for 1-20% of the total mass of the sound-absorbing slurry.

Optionally, in the step 4, the roasting temperature is 120-850° C. The roasting time is 0.5-96 h. Optionally, the temperature rise rate of roasting is 20-120° C./h.

Optionally, in the step 4, the content of oxygen in a furnace gas atmosphere during roasting is 0.1-21%.

Optionally, after the step 4, the preparation method further comprises: step 5, performing surface grafting modification treatment on the sound-absorbing material particle.

Optionally, the reaction kettle in the step 1 is made of 316L stainless steel.

The present invention further provides a sound-absorbing material particle, wherein the sound-absorbing material particle is provided with a porous ceramic substrate. A crystalline sound-absorbing material is formed on the surface of the porous ceramic substrate. The pore volume of micropores with the pore diameters of 0.5-35 μm in the sound-absorbing material particle accounts for 15-85% of the total pore volume.

Optionally, the particle size of the sound-absorbing material particle is 0.10-1.0 mm.

A technical effect of the present invention lies in that the porous ceramic substrates provides a stable and rich-channel structure. The sound-absorbing raw material forms a stable and uniform crystalline structure on the surface and in channels of the porous ceramic substrate, such that the sound-absorbing effect of the sound-absorbing material particle is improved.

Further features of the present invention, as well as advantages thereof, will become apparent from the following detailed description of exemplary embodiments of the present invention with reference to the attached drawings.

BRIEF DESCRIPTION OF THE DRAWINGS

The drawings, which are incorporated in and constitute part of the description, illustrate embodiments of the present invention and, together with the description, serve to explain the principles of the present invention.

FIG. 1 is a step flow chart of a preparation method of a sound-absorbing material particle, provided by the present invention.

DETAILED DESCRIPTION OF THE EMBODIMENTS

Various exemplary embodiments of the present invention will now be described in detail with reference to the accompanying drawings. It should be noted that the relative arrangement of the components and steps, numerical expressions and numerical values set forth in these embodiments do not limit the scope of the present present unless it is specifically stated otherwise.

The following description of at least one exemplary embodiment is merely illustrative in nature and by no means is to be construed as any limitation on the present invention and its application or use.

Techniques, methods, and apparatuses known to one of ordinary skill in the relevant art may not be discussed in detail but, where appropriate, the techniques, methods, and apparatuses should be considered part of the description.

In all of the examples shown and discussed herein, any specific value should be interpreted as merely illustrative and not as a limitation. Therefore, other examples of the exemplary embodiments may have different values.

It should be noted that like reference numbers and letters represent similar terms in the following figures, and therefore, an item needs not to be further discussed in subsequent figures as soon as it is defined in a previous drawing.

The present invention provides a preparation method of a sound-absorbing material particle. The preparation method comprises:

step 1, mixing a sound-absorbing raw material with an organic templating agent and water to prepare a sound-absorbing slurry, filling a reaction kettle with a porous ceramic substrate and the sound-absorbing slurry that are mixed together.

step 2, performing hydrothermal crystallization in the reaction kettle to ensure that the sound-absorbing raw material is crystallized on the porous ceramic substrate and constitutes the sound-absorbing material particle together with the porous ceramic substrate;

step 3, performing solid-liquid separation on the materials in the reaction kettle; and step 4, drying and roasting the sound-absorbing material particle.

In the step 1, the sound-absorbing raw material usually consists of a silicon source and an aluminum source which may react to produce aluminosilicate crystals. Lots of nano-sized micropores exist in the produced aluminosilicate crystals in an appropriate crystallization environment, such that a sound-absorbing effect may be achieved. Optionally, those skilled in the art may adopt raw materials such as natural zeolite, zeolite powder and white carbon black, which have silicon sources and aluminum sources, as the sound-absorbing raw material. The sound-absorbing raw material is not limited by the present invention. Thus, those skilled in the art may choose the raw materials in accordance with actual demands. Preferably, in the steps provided by the present invention, raw materials with chemical pure grades may be chosen as the sound-absorbing raw material, such that the crystallinity of the sound-absorbing raw material may be improved. Accordingly, defect points in a microcrystalline structure of the sound-absorbing material particle are reduced to the utmost extent. The stability of the crystalline structure and a channel structure of the sound-absorbing material particle are remarkably improved.

Particularly, as a rear cavity of a speaker is directly filled with the sound-absorbing material particles, the degree of smoothness of air circulation in the rear cavity may be affected. In order to improve the sound-absorbing effect and avoid the situation that the sound-absorbing material particles prevent air from normally entering and exiting the rear cavity, in general, air may not pass through the sound-absorbing material particles smoothly until the pore volume of micropores with the pore diameters of 0.5-35 μm in the finally prepared sound-absorbing material particles account for 15-85% of the total pore volume and the ratio of the pore volume of micropores with relatively bigger pore diameters to the total pore volume reaches a certain level. Thus, the porous ceramic substrate needs to have a certain number of micropores with relatively bigger micropores. For example, the pore volume of micropores with the pore diameters of 1-40 μm in the porous ceramic substrate should reaches a certain level. Specific proportions to which the micropores with certain pore diameters have to reach are not limited by the present invention, and may be chosen by those skilled in the art according to performance of the sound-absorbing material particle which actually needs to be produced.

Optionally, in the present invention, the role of the porous ceramic substrate is to provide the sound-absorbing material particle with a basic framework for forming. The sound-absorbing raw material may be crystallized on the surface of the porous ceramic substrate under a certain condition. Pores in the porous ceramic substrate may effectively increase its surface area. The sound-absorbing raw material is crystallized on walls of the pores, such that the sound-absorbing effect is greatly improved and the air passing smoothness may be improved. In another aspect, as the porous ceramic substrate serves as the basic framework, the finally formed sound-absorbing material particle is uniform in particle size distribution and has a stable and rich-channel structure. Optionally, the porous ceramic substrate may be a honeycomb ceramic particle or a porous ceramic microsphere. These two porous ceramic substrates may provide stable and rich-channel structures. Preferably, in order to facilitate filling and use of the finally produced sound-absorbing material particle in the rear cavity of the speaker, the particle size of the honeycomb ceramic particle or the porous ceramic microspheres should be 0.05-1.0 mm. A favorable filling effect may not be formed in the speaker if the particle size is too big, resulting in reduction of the sound-absorbing effect. The air circulation effect may be reduced if the particle size is too small. Consequently, air pressures at two sides of a vibration diaphragm of the speaker may not be quickly or sensitively balanced by the rear cavity of the speaker.

The templating agent doped with the sound-absorbing slurry is configured to provide crystallization of the sound-absorbing raw material with a microscopic framework, such that lots of nano-sized micropores may be formed in the crystalline structure of the sound-absorbing raw material for absorbing sound and vibration. The purity of the templating agent is preferably more than 95%. The added templating agent accounts for 1-20% of the total mass of the sound-absorbing slurry. Thus, the templating agent may further enrich the nano-sized channel structure of the prepared sound-absorbing material particle. A microscopic structure of the sound-absorbing raw material is utilized to improve the sound-absorbing effect of the sound-absorbing material particle to the utmost extent. Those skilled in the art may adjust the use amount and the purity of the templating agent according to actual situations, which will not be limited by the present invention. If possible, the purity of the templating agent is preferably more than 99%.

In the step 2, hydrothermal crystallization needs control of such conditions as temperature, pressure and pH value in the reaction kettle. Those skilled in the art may adjust these conditions according to actual situations, which will not be limited by the present invention. After finishing hydrothermal crystallization, solid-liquid separation needs to be performed on the remaining sound-absorbing slurry and the formed sound-absorbing material particle by means of a filter press, a centrifuge and the like.

Furthermore, the roasting procedure in the step 4 is the last procedure for preparing the sound-absorbing material particle and has a significant impact on the microscopic structure of the sound-absorbing material particle. As hydrothermal crystallization is a crystallization process performed in a liquid in the step 2, after the step 2 and the step 3, lots of water molecules still exist in crystals of the sound-absorbing material particle. The sound-absorbing material particle may not be used normally and the sound-absorbing effect may not be achieved until the water molecules are removed. However, the roasting temperature and time may influence the microscopic structure of the sound-absorbing material particle. Under appropriate control, the crystallization degree may be increased, and the structural stability of a crystal lattice may be improved. Otherwise, the crystal structure may be damaged, which directly impacts the sound-absorbing effect of the sound-absorbing material particle. Thus, under normal conditions, the roasting temperature should be 120-850° C., and the roasting time should be 0.5-96 h. Particularly, the temperature rise rate of roasting should not be too high. The microscopic structure of the sound-absorbing material particle may be severely destroyed in case of excessively fast temperature rise. In general, the temperature rise rate of roasting is 20-120° C./h. When the roasting temperature is appropriately chosen, for example, 350° C., the temperature rise rate of 45° C./h may be chosen for roasting for 30 h. In this way, the water molecules in the sound-absorbing material particle may be basically removed. Organic impurities, for example, the organic templating agent, in the sound-absorbing material particle are eliminated. Channels may be activated to guarantee the smoothness of the channel structure of the sound-absorbing material particle without damaging the microscopic structure. Preferably, the roasting temperature may be 280-550° C. The roasting time is 20-65 h. The temperature rise rate of roasting is 25-65° C./h. The above-mentioned temperature or time range usually may not damage the microscopic structure of the sound-absorbing material particle. The water molecules and the organic impurities may be substantially removed. The roasting temperature, the roasting time or the temperature rise rate of roasting will not be accurately limited by the present invention. Those skilled in the art may adjust these parameters according to actual situations. The illustrated relatively wider temperature, time and temperature rise rate ranges contain some situations that may be employed in particular cases.

More preferably, in the step 4, the content of oxygen in a furnace gas atmosphere during roasting may be 0.1-21%. The existence of oxygen may activate the nano-sized micropores and the micro-sized channels in the sound-absorbing material particle to a certain degree. Impurities in the micropores and the channels are eliminated to ensure a favorable sound-absorbing effect of the sound-absorbing material particle and smooth air circulation. Those skilled in the art may choose the content of oxygen in accordance with actual situations, or add a few of other active atmospheres in the roasting furnace gas atmosphere, which will not be limited by the present invention.

Furthermore, after the step 4, the preparation method comprises: step 5: performing surface grafting modification treatment on the sound-absorbing material particle. After such processing processes as crystallization and roasting, some unstable polar defect points may be easily formed on the surface of the sound-absorbing material particle and may react with and adsorb heterogeneous molecules in air compositions to block some channels or nano-sized micropores on the surface of the sound-absorbing material particle, which leads to reduction of the sound-absorbing effect, unsmooth air circulation and the like. In order to avoid these adverse effects, the surface of the microscopic structure may be repaired through surface grafting modification treatment for eliminating the polar defect points and for preventing such phenomena as a sound-absorbing failure.

In another aspect, a hydrothermal crystallization reaction needs to be performed in the reaction kettle in the step 2 under a certain temperature and pressure. Under this condition, the molecular activity is remarkably improved. Besides the normal hydrothermal crystallization reaction, iron ions may be released by the reaction kettle per se. The released iron ions have an extremely high probability of reacting with the sound-absorbing raw material in the crystallization process to form the polar defect points. In order to avoid this, the reaction kettle adopted in the step 2 is made of 316L stainless steel or a material above the level of 316L stainless steel. A favorable passivation layer is disposed on the surface of the 316L stainless steel, such that release of the iron ions may be effectively avoided during the hydrothermal crystallization reaction. A heteroatom may not be doped in the microscopic crystalline structure of the sound-absorbing material particle in a synthesis process. The polar detect points in the microscopic crystal structure are reduced to the utmost extent. The present invention aims to perform the steps 1 to 2 by means of the reaction kettle made of a stable material. The reaction kettle may not have to be made of 316L stainless steel. Those skilled in the art may choose reaction kettles made of other materials to perform the steps 1 to b 2.

The present invention provides a novel preparation method of a sound-absorbing material particle. A porous ceramic substrate and a sound-absorbing slurry are mixed to be subjected to hydrothermal crystallization, such that a sound-absorbing raw material may be crystallized and formed on the surface and pore walls of the porous ceramic substrate. The porous ceramic substrate provides crystallization of the sound-absorbing raw material with a basic framework. The sound-absorbing raw material may form a uniform crystalline structure in a regular shape under supporting of the porous ceramic substrate, such that the sound-absorbing effect is effectively improved. The porous ceramic substrate provides a stable micro-sized and rich-channel structure. Thus, the air circulation smoothness may be improved while the sound-absorbing effect is improved. Air blockage in the rear cavity of the speaker is avoided. On the other hand, as the porous ceramic substrate serves as the basic framework, the consumption amount of a templating agent in the sound-absorbing slurry is substantially reduced. The cost is effectively lowered. The influence of the toxic and harmful templating agent to the environment and a human body is reduced.

The present invention further provides a sound-absorbing material particle prepared by the preparation method. A porous ceramic substrate is disposed in the sound-absorbing material particle. A crystalline sound-absorbing raw material is formed on the surface and pore walls of the porous ceramic substrate. As the sound-absorbing raw material is directly adsorbed onto the porous ceramic substrate which may provide a uniform micro-sized and rich-channel structure, the sound-absorbing raw material may form a uniform and stable crystalline structure on the surface of the porous ceramic substrate, which brings about a favorable sound-absorbing effect. Furthermore, compared with a traditional non-foamed sound-absorbing material particle, the sound-absorbing material particle has the advantages that as the porous ceramic substrate serves as a base material, a process of bonding the crystalline sound-absorbing material by means of an adhesive is omitted, and the mass transfer efficiency and the sound-absorbing effect of the sound-absorbing material particle are further improved.

Preferably, the particle size of the sound-absorbing material particle is 0.10-1.0 mm. Within this range of size, the sound-absorbing material particle may be generally suitable for the rear cavity of the speaker to play a favorable sound-absorbing role. The particle size of the sound-absorbing material particle is not limited by the present invention and may be adjusted by those skilled in the art in accordance with actual situations.

In addition, the sound-absorbing material particle provided by the present invention also has other parameter characteristics. For example, the sound-absorbing material particle may have the specific surface area of 220-750 $m^2/g$ and the general pore volume of 0.4-1.9 ml/g. The pore volume of the micropores with the pore diameters of 0.5-35 μm in the particle generally accounts for 15-85% of the total pore volume of the particle. Those skilled in the art may adjust the parameters of the sound-absorbing material particle according to speakers with various rear cavity structures.

Although some specific embodiments of the present invention have been described in detail by way of example, those skilled in the art should understand that the above examples are only for the purpose of illustration and are not intended to limit the scope of the present invention. It will be understood by those skilled in the art that the above embodiments may be modified without departing from the scope and spirit of the present invention. The scope of the present invention is defined by the appended claims.

What is claimed is:

1. A preparation method of a sound-absorbing material particle, comprising:
   mixing a sound-absorbing raw material with an organic templating agent and water to prepare a sound-absorbing slurry, the organic templating agent being an organic impurity relative to the sound-absorbing raw material;
   filling a reaction kettle with a porous ceramic substrate and the sound-absorbing slurry that are mixed together;
   performing hydrothermal crystallization in the reaction kettle to ensure that the sound-absorbing raw material is crystallized on the porous ceramic substrate and constitutes the sound-absorbing material particle together with the porous ceramic substrate;
   performing solid-liquid separation on materials in the reaction kettle; and
   drying and roasting the sound-absorbing material particle.

2. The preparation method according to claim 1, wherein the porous ceramic substrate is a honeycomb ceramic particle or a porous ceramic microsphere, of which a particle size is 0.05-1.0 mm.

3. The preparation method according to claim 1, wherein a purity of a material that makes up the organic templating agent is more than 95%, and an addition of the organic templating agent accounts for 1-20% of a total mass of the sound-absorbing slurry.

4. The preparation method according to claim 1, wherein a roasting temperature is 120-850° C., and a roasting time is 0.5-96 h.

5. The preparation method according to claim 4, wherein a temperature rise rate of roasting is 20-120° C./h.

6. The preparation method according to claim 1, wherein a content of oxygen in a furnace gas atmosphere during roasting is 0.1-21%.

7. The preparation method according to claim 1, wherein the reaction kettle is made of 316L stainless steel.

* * * * *